No. 703,380. Patented July 1, 1902.
J. BUTLER.
NUT LOCK.
(Application filed Nov. 9, 1901.)
(No Model.)
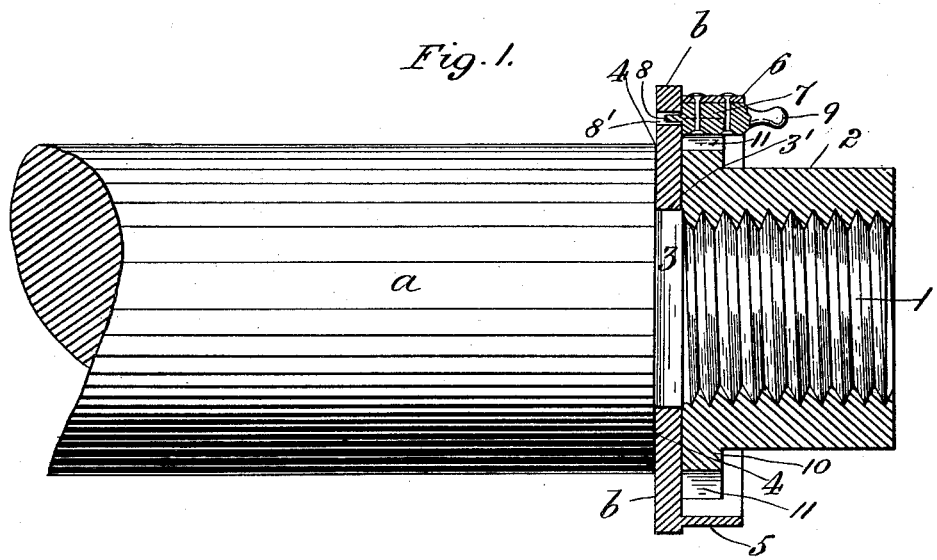
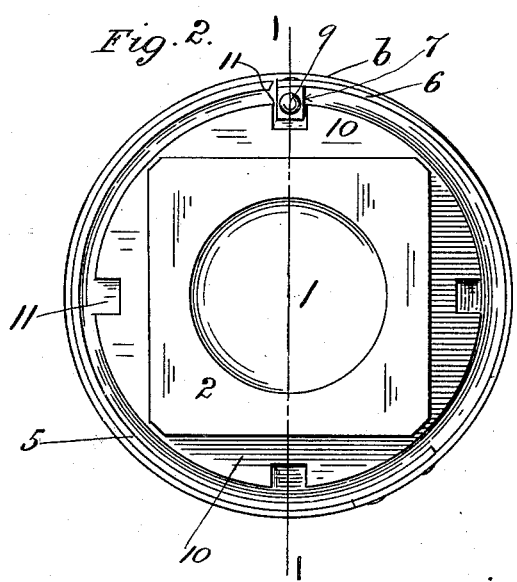
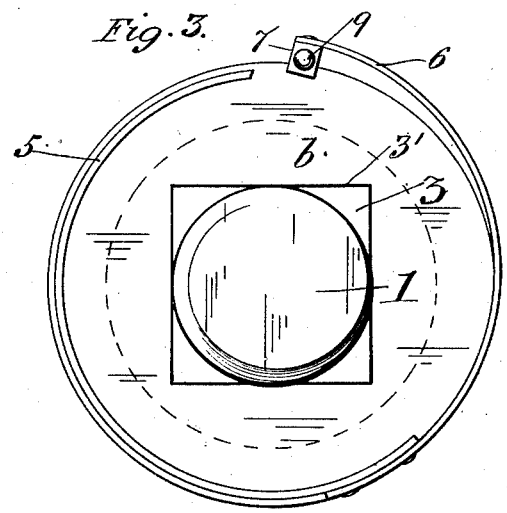
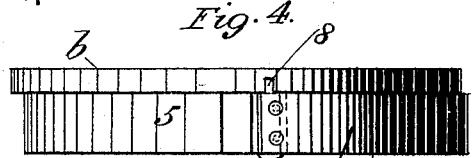
WITNESSES
J. M. Benbow
W. J. S. Mullen
INVENTOR
James Butler
By Edward W. Furrell
His Attorney

UNITED STATES PATENT OFFICE.

JAMES BUTLER, OF ST. LOUIS, MISSOURI.

NUT-LOCK.

SPECIFICATION forming part of Letters Patent No. 703,380, dated July 1, 1902.

Application filed November 9, 1901. Serial No. 81,715. (No model.)

*To all whom it may concern:*

Be it known that I, JAMES BUTLER, a citizen of the United States, residing at St. Louis, in the State of Missouri, have invented a new and useful Improvement in Nut-Locks, of which the following is a specification.

My invention relates to an improvement in nut-locks for bolts and the like, and is especially adapted for securing the nuts on the ends of a vehicle-axle.

The invention consists in features of novelty as hereinafter described and claimed, reference being had to the accompanying drawings, forming part of this specification, whereon—

Figure 1 is a longitudinal section through my improved nut-lock on line 1 1 in Fig. 2 as applied to a wagon-axle; Fig. 2, an end view thereof as seen from the right of Fig. 1; Fig. 3, a similar view to Fig. 2 with the lock released and the nut removed, and Fig. 4 an edge view of the locking device detached.

Like letters and numerals of reference denote like parts in all the figures.

$a$ represents a wagon-axle (bolt or rod) broken away, having the reduced screw-threaded end portion 1 for receiving the nut 2. The base 3 of the end portion 1 at its junction with the axle $a$ is preferably square-shaped, but may be pentagonal or other suitable shape on its perimeter, the axle $a$ (bolt or the like) forming a shoulder 4 thereat around the base 3.

$b$ is a circular washer having a central hole 3', corresponding to the base 3, on which the washer $b$ is fitted, and thereby prevented from turning, one side of the washer $b$ bearing against the shoulder 4 of the axle $a$. From the other side or outer face of the washer $b$, at right angles thereto, preferably projects a circular segmental rim or flange 5, which is concentric with and in proximity to the circumference of the washer $b$. To one end of the segmental rim or flange 5 is fixed one end of a preferably flat spring 6, which is practically an extension of the rim or flange 5 and normally closes the gap between the ends thereof, as seen in Fig. 2, the free end portion of the spring 6 having a pawl or tooth 7 fixed thereto and projecting from its inside or concave face. On the end of the pawl or tooth 7, adjacent to the outside face of the washer $b$, is a projecting pin 8, which when the spring 6 is in its normal or closed position, as seen in Fig. 2, engages in a hole 8', formed in the washer $b$, and thereby locks the spring 6. On the opposite or outer end of the pawl or tooth 7 is a projecting stud or handle 9 for the purpose hereinafter described.

Around and preferably flush with the inside face of the nut 2, which engages the screw-threaded end portion 1 of the axle (bolt or the like) $a$, is a circular flange 10, having circumferential notches 11 formed transversely therethrough at suitable distances apart, each notch 11 being slightly wider than the thickness of the pawl or tooth 7 of the spring 6.

In operation the washer $b$ is placed in position on the base 3 and against the shoulder 4 of the axle (bolt or the like) with the spring 6 in the "unlocked" position and constrained outward at its free end by its handle 9, in which position it is held by causing the pin 8 to bear upon the peripheral edge of the washer $b$, as seen in Figs. 3 and 4. The nut 2 is then engaged with the screw-threaded end portion 1 of the axle $a$ until its inside face and flange 10 is screwed tightly home against the washer $b$, with one of its notches 11 in position for engagement by the pawl or tooth 7, when the spring 6 is released by the handle 9 from its unlocked position (seen in Figs. 3 and 4) and by its resilience throws the pawl or tooth 7 into the said notch 11, and thereby (the washer $b$ being non-revoluble) securely locks the nut 2 and is itself locked simultaneously by the pin 8 engaging the hole 8' in the washer $b$.

If desired, the rim or flange 5, which is preferred in the case of a vehicle-axle as described, may be dispensed with for ordinary bolts and the like and the end of the spring 6 fixed directly to the face of the washer $b$ in any suitable manner.

What I claim as my invention, and desire to secure by Letters Patent, is—

In a nut-lock, the combination with an axle (bolt or the like) having a reduced screw-threaded end portion and shoulder thereat, of a washer, non-revoluble on the said end portion and bearing against the said shoulder, a nut adapted to engage the said end portion and formed with a surrounding circular flange having a circumferential notch, the said nut bearing against the washer, a spring fixed at one end to the washer opposite to the periphery of the said flange, a pawl or tooth projecting from the spring and adapted to engage the said notch, a pin projecting from the pawl and adapted to engage in a hole in the washer, and means for disengaging the pawl and pin from the said notch and hole respectively, and for holding the pawl and spring in the unlocked and retracted position, substantially as described.

In testimony whereof I have signed my name to this specification in the presence of two subscribing witnesses.

JAMES BUTLER.

Witnesses:
ROBT. LUCAS,
E. E. SCHNEPP.